United States Patent
Sannoh et al.

(10) Patent No.: US 6,750,914 B2
(45) Date of Patent: Jun. 15, 2004

(54) IMAGE PICK-UP DEVICE

(75) Inventors: Masato Sannoh, Kanagawa (JP); Noriaki Ojima, Kanagawa (JP)

(73) Assignee: Ricoh Company, Limited, Tokyo (JP)

(*) Notice: Subject to any disclaimer, the term of this patent is extended or adjusted under 35 U.S.C. 154(b) by 0 days.

(21) Appl. No.: 10/120,369

(22) Filed: Apr. 12, 2002

(65) Prior Publication Data
US 2002/0149689 A1 Oct. 17, 2002

(30) Foreign Application Priority Data

Apr. 12, 2001 (JP) ........................................ 2001-114321
Apr. 19, 2001 (JP) ........................................ 2001-121816

(51) Int. Cl.[7] ........................ H04N 5/222; H04N 5/232; G03B 13/00
(52) U.S. Cl. .............. 348/346; 348/333.02; 348/333.04
(58) Field of Search ................ 348/346, 349, 348/333.02, 333.03, 333.04, 208.15, 208.16, 211.13, 345, 348, 350, 353, 354, 355, 356

(56) References Cited

U.S. PATENT DOCUMENTS

| | | | |
|---|---|---|---|
| 4,322,141 A | | 3/1982 | Tominaga et al. |
| 5,189,460 A | * | 2/1993 | Hayakawa .................. 396/123 |
| 5,504,584 A | | 4/1996 | Soeda |
| 5,506,620 A | | 4/1996 | Ozawa |
| 5,506,654 A | | 4/1996 | Kim |
| 5,597,999 A | * | 1/1997 | Kinba et al. ............. 250/201.7 |
| 5,650,607 A | * | 7/1997 | Kusaka .................... 250/201.8 |
| 5,727,234 A | | 3/1998 | Sakagami et al. |
| 5,815,748 A | * | 9/1998 | Hamamura et al. ......... 369/104 |
| 6,362,851 B1 | * | 3/2002 | Lavelle et al. ......... 348/333.01 |
| 6,363,221 B1 | * | 3/2002 | Tokunaga et al. ........... 396/157 |
| 2001/0026683 A1 | * | 10/2001 | Morimoto et al. ............ 396/89 |

FOREIGN PATENT DOCUMENTS

| | | | |
|---|---|---|---|
| JP | 62-146078 | 6/1987 | |
| JP | 5-119250 | 5/1993 | |
| JP | 2001-047315 | 2/2000 | |
| JP | 1 017 232 | 7/2000 | |
| JP | 2000-321482 | 11/2000 | |
| JP | 2001133679 A | * 5/2001 | ............ G02B/7/28 |

OTHER PUBLICATIONS

U.S. patent application Ser. No. 10/244,670, filed Sep. 17, 2002, pending.
U.S. patent application Ser. No. 10/354,086, Ojima et al., filed Jan. 30, 2003.
U.S. patent application Ser. No. 10/340,660, Ojima et al., filed Jan. 13, 2003.
U.S. patent application Ser. No. 10/452,050, Kitajima et al., filed Jun. 3, 2003.

* cited by examiner

*Primary Examiner*—Andrew Christensen
*Assistant Examiner*—Brian C Genco
(74) *Attorney, Agent, or Firm*—Oblon, Spivak, McClelland, Maier & Neustadt, P.C.

(57) ABSTRACT

An image pick-up device comprises a central processing unit which obtains photography advisability information showing whether or not an image can be picked-up, and an image preprocessor which displays a target mark used as the photography criterion on a display. The image preprocessor changes a form of the target mark based on the content of the photography advisability information.

20 Claims, 8 Drawing Sheets

(STANDBY)

WIDTH OF THE DISTANCE MEASURING POINTS (AFTER FOCUSING)

(AFTER FOCUSING)

AFTER THE FOCUSING OPERATION

BEFORE THE FOCUSING OPERATION

AFTER THE FOCUSING OPERATION

IMAGE PICK-UP DEVICE

FIELD OF THE INVENTION

The present invention relates to an image pick-up device.

BACKGROUND OF THE INVENTION

Recently, image pick-up devices such as digital cameras, video cameras, information terminals with a photography function, or the like are widely used. The image pick-up device picks-up an image of an object using a solid image pick-up element such as a CCD (charge coupled device). The CCD obtains image data of a still image or a movie image of the object so that the data are recorded in an IC (integrated circuit) card, a disc medium, or the like digitally. As the IC card to be used, various types are used. That is, IC memory cards using a flash memory called a small card, or the like, such as a smart medium, a compact flash (CF card), a memory stick, a multimedia card (MMC), an SD card, or the like are used commonly.

The image pick-up devices available in the market have a display device such as a liquid crystal device (LCD). This display device displays the photographed image. The display device can often be used as an electron view finder which determines the framing, the angle, or the like of the photography field of view, that is, an electron finger similar to an optional view finder, that, is a so-called finder by displaying the image picked-up by the image pick-up element on the display device before photographing. There are also known image pick-up devices which display information to be the criterion to decide whether or not the image is to be picked-up. Such a display facilitates the image picking-up.

For example, Japanese Patent Application Laid-Open No. 2000-47315 discloses a technique of displaying the distance as the distance measurement range or the distance measurement result in a liquid crystal display. However, in the configuration of displaying the distance as the distance measurement result, or the like, on the liquid crystal display although the distance measurement result can be recognized further specifically, since the display can be complicated or the displayed numerals of the distance measurement range, or the like is superimposed on the principal object so as to be hardly observed, a problem of interference of photography can be involved.

As the elements which determine the photography result in the photography, there are mainly, the brightness, the focus, the blurring degree, the composition, the angle, the flaming, or the like. According to recent development of the auto exposure (AE) controlling technique and the stroboscope controlling technique, as to the brightness, the brightness as intended by the photographer can easily be obtained. Moreover, according to development of the auto focusing (AF) technique, also as to the focusing, little risk of photography failure is involved.

Conventionally, there is a camera which focuses by combining two or more kinds of auto focusing methods for improving the focusing ratio in the auto focusing system. The focusing function of combining two or more kinds of the auto focusing methods is called the hybrid auto focusing function.

In general, as the auto focusing system, there are two types in terms of the focusing operation. The first type is for obtaining an appropriate focusing state by measuring the object distance and determining the projection amount of the photography lens in relation to the distance measuring operation or according to the distance measuring result. The second type is for obtaining an appropriate focusing state by changing the projection amount of the photography lens while analyzing and judging the focusing state and the deviation from the focal point from the image information obtained via the photography lens, such as the contrast information.

Since the appropriate focusing state is to be obtained finally both in the instance of the first type of obtaining the focusing state indirectly by the direct distance measurement and the instance of the second type of obtaining the focusing state by indirectly measuring the distance by the direct detection of the focusing state, the both focusing operations are referred to as "focusing" herein.

According to the hybrid auto focusing function, the detection subject areas, such as the distance measurement area, the focusing detection area, or the like, of each of the combined auto focusing systems may differ depending on the auto focusing systems. According to the hybrid auto focusing function, by combining the focusing result of a plurality of auto focusing systems, the focusing result of any one auto focusing system in the plurality of the auto focusing systems, or the synthesized result of the plurality of the auto focusing systems is used as the focusing results of the hybrid auto focusing function. In this instance, there is a risk of having a focusing operation with respect to another object in the photography field of view instead of a focusing operation with respect to an object intended by the user.

Conventionally, the detection subject area of the auto focusing system, that is, a frame showing the focusing area, or the like is shown the finder field of view in an electron finder or an optical finder.

However, according to a camera mounting a conventional hybrid auto focusing function, since the detection subject area of each auto focusing system comprising the hybrid auto focus or a combination thereof, that is, the focusing area or the focusing judgment result is not displayed, a problem is involved in that the user cannot see the detection subject area by the hybrid auto focusing, the focusing result, or the like specifically.

SUMMARY OF THE INVENTION

It is an object of the present invention to provide an image pick-up device capable of easily displaying image picking-up advisability information ("photography advisability information") showing advisability of the image picking-up ("photography") in an easily understandable form without preventing the photography operation.

It is another object of the present invention to provide an image pick-up device having a hybrid auto focusing function as a combination of a plurality of auto focusing methods, wherein the detection subject area and the focusing judgment result can be provided in detail specifically to the user.

According to the first aspect of the invention, a target mark is displayed in a monitor display section or a finder display section and a form of the target mark is changed according to the content of the photography advisability information.

According to the second aspect of the invention, a detection subject area and the focusing judgment result by the auto focusing function as a combination of a plurality of auto focusing methods are displayed.

Other objects and features of this invention will become apparent from the following description with reference to the accompanying drawings.

DETAILED DESCRIPTIONS

Embodiments of the image pick-up device of the present invention will be explained in detail below with reference to the accompanied drawings.

Figure 1:
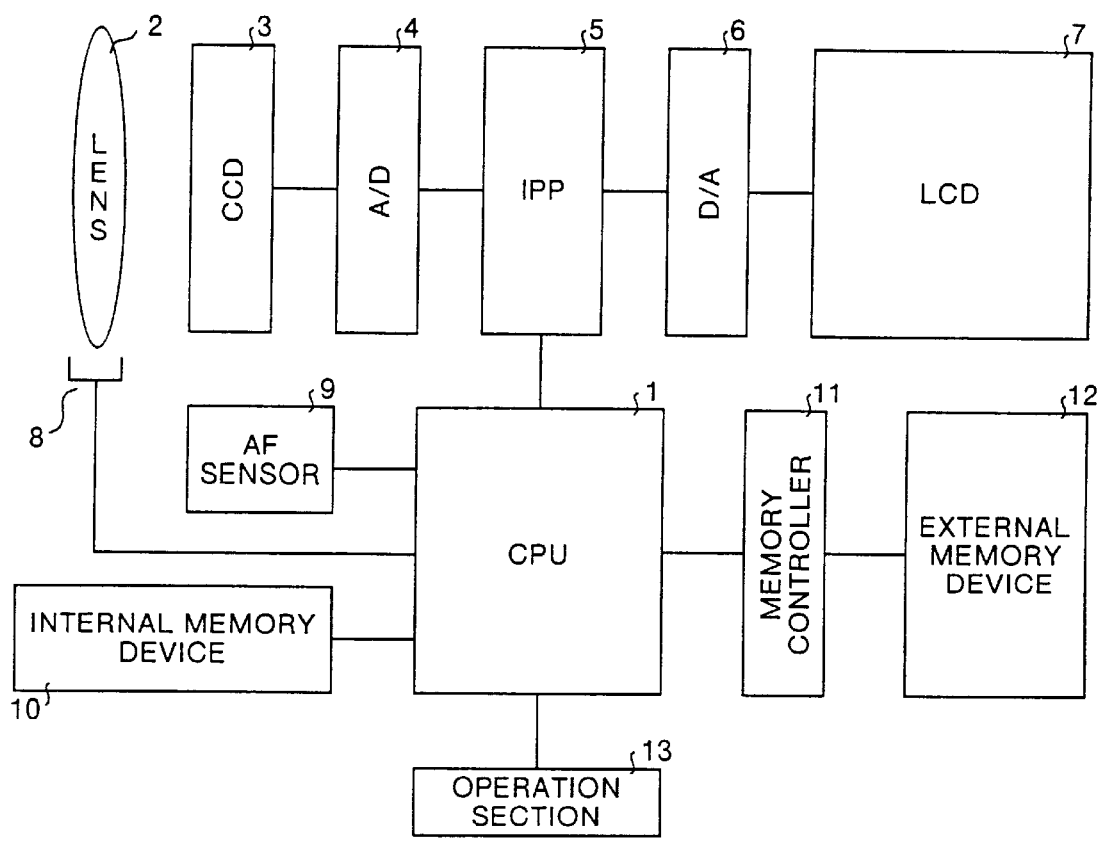
FIG. 1 is a block diagram which shows the configuration of a principal part of a digital camera according to an embodiment of the present invention.

A digital camera according to a first embodiment will be explained with reference to FIG. 1 to 4. FIG. 1 is a block diagram which shows the configuration of the principal part of the digital camera according to the present invention. The digital camera shown in FIG. 1 comprises a CPU (central processing unit) 1, a photography lens system 2, a CCD image pick-up element 3, an A/D (analog-digital) converter 4, an image preprocessor (IPP) 5, a D/A (digital-analog) converter 6, a liquid crystal display device (LCD) 7, a lens driving system 8, an AF sensor 9, an internal memory device 10, a memory controller 11 and an external memory device 12.

The CPU 1 is in charge of the mechanical driving control, the electronic driving control, and the data processing concerning various operations in the digital camera according to control programs stored in an not-shown ROM in response to the operation command from an operation section 13. Specifically, it controls the auto focusing, the AWB, the automatic exposure, the photography operation, or the like.

The photography lens system 2 is an optical system which forms an object image on the input surface of the CCD image pick-up element 3 as the solid image pick-up element. The CCD image pick-up element 3 converts the optical image of the object image formed on the input surface into an electric signal. The A/D converter 4 converts an object image signal as an analog signal outputted from the CCD image pick-up element 3 into object image data as a digital signal. The IPP 5 applied a predetermined image process to the object image data controlled by the CPU 1 and digitized by the A/D converter 4 as well as it applied a predetermined image process to the image data provided by the CPU 1 as needed. Moreover, the IPP 5 supplies the processed image data to the CPU 1 as well as to the D/A converter 6 as needed. The D/A converter 6 converts the image data as the digital signal supplied from the IPP 5 into an analog image signal for display and it supplies the same to the liquid crystal display device 7.

The lens driving system 8 is controlled by the CPU 1 so as to drive the photography lens system 2 in the optical axis direction for the focusing adjustment. Moreover, it is also possible to displace the photography lens system 2 by manually operating the lens driving system 8.

The AF sensor 9 is a sensor which obtains the distance measurement information by measuring the object distance by the passive auto focusing method or the active auto focusing method. It comprises a phase difference type sensor, an infrared ray type sensor, or the like. The distance measurement information of the AF sensor 9 is supplied to the CPU 1. The CPU 1 controls the AF sensor 9 which measures the distance with respect to the photography object, and controls the lens driving system 8 according to the distance measurement result for displacing the photography lens system 2 which executes the auto focusing control with respect to the photography object.

The internal memory device 10 comprises a semiconductor memory, or the like, including a RAM (random access memory), a ROM (read only memory), or the like subordinate to the CPU 1. It stores the image data sent from the IPP 5 to the CPU 1, the image data processed by the CPU 1, the processing process data including the intermediate data concerning the CPU 1 operation and the controlling process, or the like.

The external memory device 12 is a memory device which stores the photographed and taken image data. In general, a memory medium using a flash memory, or the like, and a memory device such as a hard disc, can be used. As the memory medium using a flash memory, or the like, the so-called SD card, the smart medium, the compact flash, the multimedia card, the memory stick, or the like, are known.

The memory controller 11 is an interface which controls the writing operation from the CPU 1 to the external memory device 12 and the reading operation from the external memory device 12 by the CPU 1, or the like. The operation section 13 comprises various buttons which commands the digital camera operation by the user, such as a release button, a mode selection button which selects the mode, or the like.

At the time of the photography, the above-mentioned CPU 1 has the object image provided via the photography lens system 2, the CCD image pick-up element 3, the A/D converter 4 and the IPP 5 displayed by the LCD 7 via the D/A converter 6. Although it is not clearly shown, the operation of the CCD image pick-up element 3, the A/D converter 4, the D/A converter 6 and the LCD 7 is controlled also by the CPU 1.

Moreover, the CPU 1 executes the focusing operation ordinarily by a predetermined cycle. That is, a release button (not shown) is provided as a two stage step operation release button such that in the first stage operation of the release button of the so-called half pressed state, the focusing control is newly executed as well as the focusing result is maintained during the release button first stage operation, that is, as long as the half pressed state is continued. In the instance the release button is released in this state, the CPU 1 is returned to the focusing operation control of the predetermined cycle. Moreover, in the instance the release button is further pressed from the release button first stage operation of the half pressed state so as to have the release button in the second stage, that is, the totally pressed state, the CPU 1 stores the image data in the internal memory device 10, displays the image confirmation screen on the liquid crystal display device 7, or the like, and executes the take-in transfer to the external memory device 12.

The CPU 1 serves as a photography advisability information obtaining unit, and the CPU 1 and the IPP 5 serve as a display controlling unit.

Figure 2A:
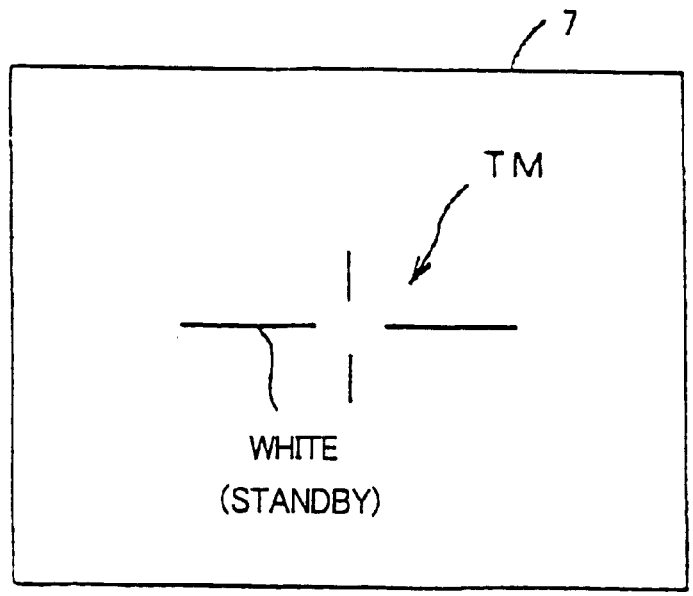
FIG. 2A and FIG. 2B are diagrams which explain the target mark and the "display form change"
Figure 2B:
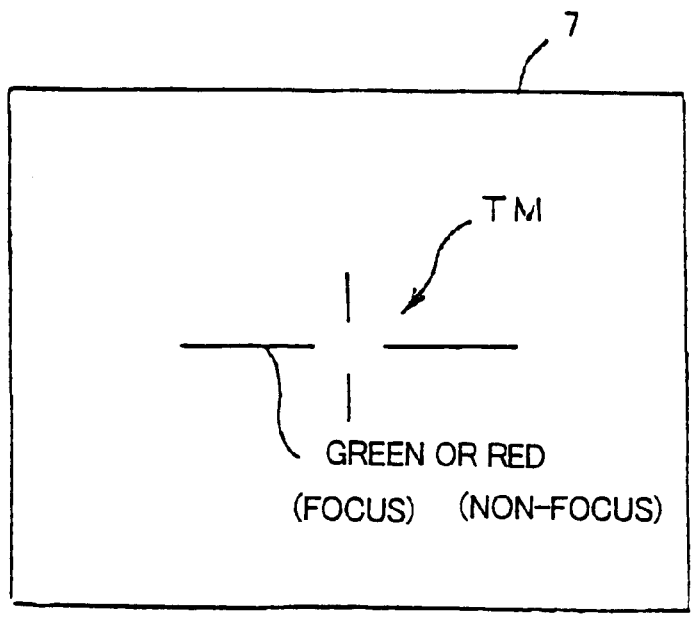
Figure 3:
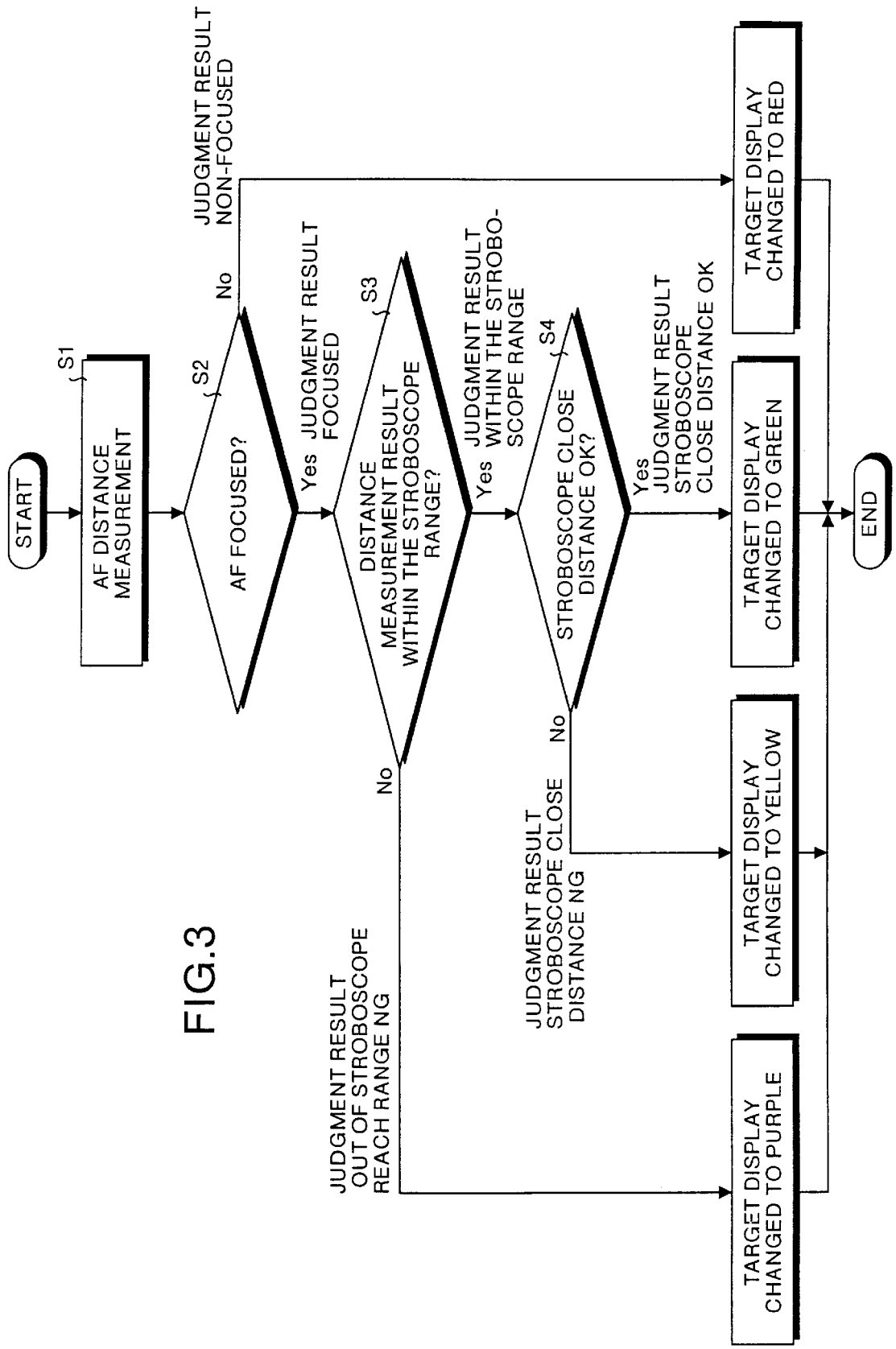
FIG. 3 is a flow chart which explains the displaying operation of the target mark TM.

Next, with reference to FIGS. 2A, 2B, 3, 4A to 4C, the display control for the target mark TM displayed on the LCD 7 of the digital camera of FIG. 1 will be explained. FIG. 2 is a diagram which explains the target mark and the "display form change", and FIG. 3 is a flow chart which explains the display control for the target mark.

FIG. 2A shows a target mark to be displayed on the LCD 7 as the monitor display section. The target mark TM has a "cross-like shape with vertical and lateral straight lines combined like a cross, with the intersection part of the lines omitted". For the standby display, it is shown in "white color". The LCD 7 is for the color image display, capable of displaying a desired color.

The target mark TM is produced by the CPU 1 and it is synthesized with an image by a RAW signal processed by the YUV conversion by the IPP 7.

The photographer understands the tilt in the horizontal and vertical directions with reference to the vertical and lateral lines of the target mark TM displayed in the LCD 7 so as to execute the auto focusing control with the composition determined. According to the auto focusing operation, the photography lens system 2 is displaced and an image (RAW data) taken from the CCD3 is displayed on the LCD 7 as mentioned above.

According to the auto focusing operation, the focus/non-focus thereof is displayed as the "target mark TM display form" shown in FIG. 2B.

That is, when the focus state is not realized after starting the auto focusing control operation, the "target mark TM is displayed in red color" as the non-focus (that is, photography unadvisable) state. When the focus state is realized after executing the auto focusing control, the "target mark TM is displayed in green color" as the photography advisable state. Accordingly, by changing the target mark TM display forms (display colors), the photographer can know the auto focusing control result immediately.

In the instance the target mark TM is displayed in green color, since the photography can be executed, the photographer executes the photography. At the time, the photographed image information has the image process by the IPP 7 so as to be stored in the internal memory device 19 via the CPU 1. Or it is also possible to store the same in the external memory device 23 via a memory controller 21.

Although the instance of executing the auto focusing control using the distance measurement result of the AF sensor 9 has been explained in the above-mentioned description, the "contrast detection type" auto focusing control of using the CCD 3 as the AF sensor instead of the AF sensor 9, detecting the contrast of the image inputted to the CCD 3 while driving the photography lens system 2 by a predetermined amount, and disposing the photography lens system 2 at a part with the highest contrast, can be executed. Also in this instance, as mentioned above, the focus/non-focus state can be advised to the photographer easily and certainly by changing the target mark display form (color).

Moreover, to change the display form, in addition to the method of changing the color, it is also possible to flicker the target mark TM and change the flickering cycle. For example, the flickering cycle can be made shorter in the non-focus state, and the flickering can be provided in a "slower cycle" when the focus is realized.

Furthermore, although the instance of displaying the focus/non-focus state in the auto focusing control has been explained, in the instance the AF sensor 9 has a distance measuring function, since the distance with respect to the photography object and the photography lens system 2 displacement amount can be related, the focus/non-focus state can be displayed by the target mark display form (color, flickering cycle, or the like) also in the instance of executing the manual focusing operation.

The target mark TM display operation in the above-mentioned digital camera will be explained with reference to the flow chart of FIG. 3.

In FIG. 3, at the time of the start, it is in the state that the photographer prepares the digital camera. At the time, as shown in FIG. 2A, the target mark TM is displayed in "white color" to show the standby state. The photographer determines the composition according to the displayed white color target mark TM and half-presses the release button which starts the auto focusing control.

In FIG. 3, first, in the instance the release button is half-pressed by the photographer, the CPU 1 executes the auto focusing control by the AF distance measurement, that is, by measuring the distance with respect to the object (step S1). Thereafter, the CPU 1 judges whether or not it is focused (in the figure "AF focus") as a result of the auto focusing control (step S2). In the instance it is focused as the result of the judgment, it moves on to the step S3. In contrast, it is not focused, that is, it is non-focused, the CPU 1 controls the IPP 5 so as to change the target mark TM display color from the standby display "white color" to "red color" as shown in FIG. 3 (step S8). While the target mark TM is in red, it represents the "photography unadvisable state".

At the step S3, when the focus state is realized in the auto focusing control, the CPU 1 judges whether or not the photography distance at the time (it is known as the "distance measurement result") is in a range of having the stroboscope effectively workable (in the figure "within the distance measurement result stroboscope range"). According to the judgment result, in the instance the photography distance is a distance out of effective reach of the stroboscope light (in the figure "judgment result out of stroboscope reach range NG"), since the stroboscope cannot be used as to the "stroboscope use advisability information" as the photography advisability information, the CPU 1 changes the target mark TM display color to "purple color" (step S5). The target mark TM "purple color" denotes that the stroboscope light cannot reach the photography object effectively. By observing the display, the photographer can stop the use of the stroboscope. That is, photography of an image with an insufficient light amount by the wasteful stroboscope light emission, or consumption of the battery can be prevented. In this instance, the photographer can change the composition so as to have the "stroboscope use advisable".

In contrast, at the step S3, in the instance the distance measurement result is "within the distance measurement result stroboscope range", the CPU 1 further judges whether or not the "close distance with the excessive stroboscope light", that is, "whether the so-called "white skip" of the object is not generated in the instance the light is emitted from the stroboscope" ("stroboscope close distance OK" in the figure) (step S4).

As a result of the judgment, in the instance the "judgment result stroboscope close distance NG", the target mark TM color is changed to "yellow color" (step S6). The target mark TM "yellow color" denotes that it is such a close distance that the stroboscope light is excessive. In this instance, the photographer can change the composition so as to have the "stroboscope use advisability". Thereby, the "photography without generation of a white skip image by the stroboscope" can be enabled.

In contrast, at the step S4, in the instance the judgment result is the "stroboscope close distance OK", since the stroboscope can be used as well as it is in the focused state, the CPU 1 changes the target mark TM color to "green color" (step S10). The target mark TM "green color" denotes that the stroboscope can be used and it is in the focused state. Therefore, in the instance of photography using the stroboscope, appropriate photography can be executed when the target mark TM is in the "green color".

In the instance the use of the stroboscope is not selected, the focus state is displayed by the green color target mark, and the non-focus state is displayed by the red color target mark.

The target mark TM display colors are not limited to the above-mentioned "green, red, yellow and purple", but a combination of other colors can be used as well.

Moreover, instead of having the target mark TM display form as the "different colors", naturally, the above-mentioned "photography advisability information" displays can be provided by the target mark TM flickering cycles. Furthermore, different target mark TM display forms can be provided by combining the display colors and the flickering cycles as well.

Of course, not only in the auto focusing control, but also in the manual focusing mode, according to the distance measurement, the photography advisability information display can be provided as the target mark display coloring or the flickering cycles.

As heretofore explained, according to the first embodiment, since the target mark TM to be used as the criterion for the photography is displayed, superimposed on the monitoring image displayed on the LCD 7, and the target mark TM display form is changed according to the content of the photography advisability information for displaying whether the photography can be executed or not, the advisability of the photography can be displayed by changing the target mark display forms without the need of displaying the distance measurement range based on the distance measurement result, or the like so that the photography advisability information showing the advisability of the photography can be displayed simply in an easily understandable form without preventing the photography. Thereby, the photographer can execute the photography operation appropriately while observing the image to be photographed in a good state.

Moreover, since the focus/non-focus state in the auto focusing control is displayed as the target mark display forms using the focus result information (focus/non-focus) in the auto focusing control as the above-mentioned photography advisability information, the photographer can easily recognize whether the object is in the focused state (photography advisable) or not (photography unadvisable) in the auto focusing control so that the so-called "out of focus" photography can effectively be prevented.

Furthermore, since the stroboscope use advisability information is displayed as the target mark display forms using the stroboscope use advisability information based on the distance measurement information (inside or outside the stroboscope reach limit distance range information, inside or outside the stroboscope shortest distance range information) as the above-mentioned photography advisability information, the photographer can recognize that the stroboscope light cannot effectively reach the photography object so that the wasteful stroboscope light emission can be prevented.

Moreover, since the focus/non-focus state can be displayed as the target mark display form by using the focus/non-focus information by the distance measurement information at the time of the manual focusing as the above-mentioned photography advisability information, and executing the focus judgment by comparing the object distance by the manual focusing operation with the distance measurement information, the photography can be executed in an appropriately focused state also at the time of the manual focusing.

Furthermore, since the target mark TM is provided in a cross-like shape, observation of the object image or the finder image can hardly be prevented. Moreover, it can be the criterion in the vertical direction, facilitates determination of the photography image composition, and further it is useful for the check of the image tilting (horizontal/vertical). As the target mark, a known target mark can be used as well. For example, those with a rectangular shape or a parenthesis shape can be used.

Figure 4A:
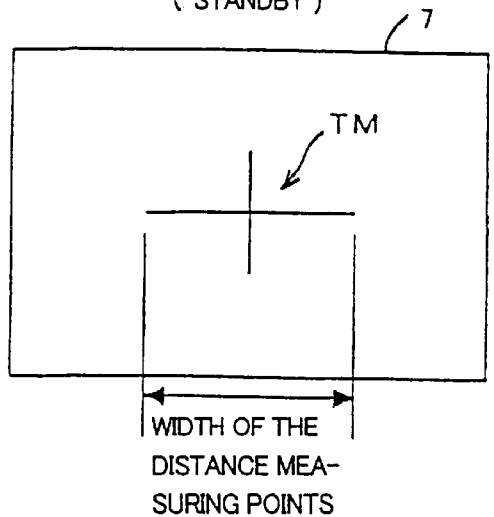
FIG. 4A to FIG. 4C are diagrams which explain the target mark display method in the instance of a multiple point distance measurement auto focusing.
Figure 4B:
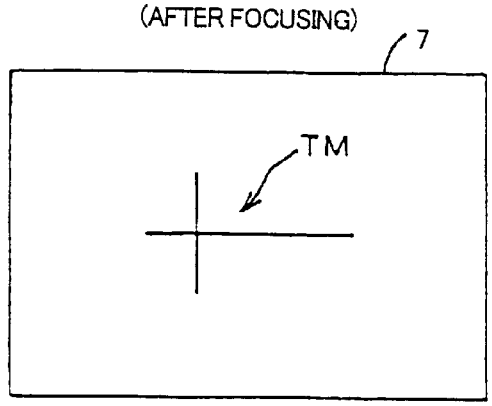
Figure 4C:
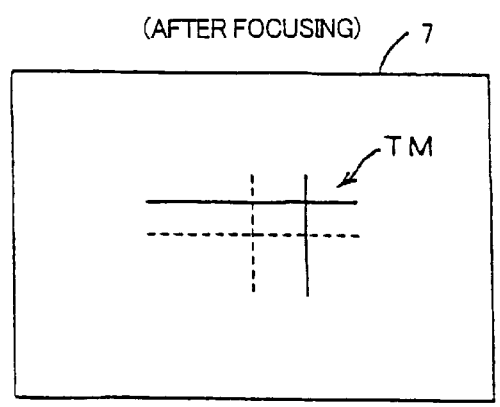

The target mark display example in the instance the digital camera comprises a multiple point distance measuring auto focusing function (the case the AF sensor 9 can measure the multiple point distances) will be explained with reference to FIGS. 4A to 4C. FIGS. 4A to 4C are diagrams which explain the target mark display example in the instance the multiple point distance measuring auto focusing function is provided. FIG. 4A shows a target mark display example in the standby state, and FIG. 4B and 4C show target mark display examples after focusing.

As shown in FIG. 4A, in the standby state, the distance measurement point width (distance measurement area width) is shown by the cross-like shaped target mark TM lateral line length (vertical line length can be used as well). Then, as shown in FIGS. 4B and 4C, the object focusing position is shown by crossing the vertical line and the lateral line of the cross-like shaped target mark. Thereby, also in the instance of the multiple point distance measuring auto focusing, the distance measurement area can easily be observed as well as the focusing position can easily be recognized. Also in this instance, as mentioned above, the target mark TM display color is changed according to the photography advisability information.

Although the target mark TM is displayed in the LCD 7 as the monitor display section in the above-mentioned first embodiment, the target mark TM can be displayed in an optical type finder display section.

A digital camera according to a second embodiment will be explained with reference to FIGS. 5 to 10. The hardware configuration of the digital camera according to the second embodiment is same as that of the first embodiment.

The digital camera of the second embodiment comprises a hybrid auto focusing function. The above-mentioned CPU 1 has a function which detects the focus state based on the object image data supplied from the IPP 5, for example, by the contrast analysis, or the like.

Moreover, at the time of the photography, the CPU 1 has the object image provided via the photography lens system 2, the CCD image pick-up element 3, the A/D converter 4 and the IPP 5 displayed on the liquid crystal display device 7 via the D/A converter 6. Although it is not clearly shown, the operation of the CCD image pick-up element 3, the A/D converter 4, the D/A converter 6 and the LCD 7 is controlled also by the CPU 1. Furthermore, the CPU 1 realizes the hybrid auto focusing function by the auto focusing method by the distance measurement information from the AF sensor 9 using for example a phase difference type sensor and the auto focusing method by the contrast analysis of the image information provided by the IPP 5, or the like so as to execute focusing by controlling the lens driving system 8 on occasion based on the combination thereof. In this instance, as the hybrid auto focusing function, the two kinds of the auto focusing methods, that is, the phase difference type auto focusing method by the AF sensor 9 and the contrast detection type auto focusing method by the contrast analysis are combined so as to execute the focusing operation by combining the focusing results thereof.

Moreover, by operating the operation section 13, the user can select as the criterion for the judgment of succeeding in focusing by the hybrid focusing function any of the (a) method of judging that it is focused finally in the instance both of the phase difference type auto focusing method and the contrast detection type auto focusing methods succeeded in focusing, the (b) method of judging that it is focused finally in the instance at least one of the phase difference type auto focusing method and the contrast detection type auto focusing method succeeded the focusing, the (c) method of judging that it is focused finally in the instance either of the phase difference type auto focusing method and the contrast detection type auto focusing method is selected automatically based on the brightness in the detection subject area or the vicinity thereof, and the selected auto focusing method succeeded in focusing, and the (d) method of judging that it is focused finally in the instance the auto focusing method preliminarily selected by the operation of the operation section 13 by the user from the phase difference type auto focusing method and the contrast detection type auto focusing method succeeded in focusing. The CPU 1 judges the focusing of the hybrid focusing function according to the criterion selected by the operation section 13.

Figure 6:
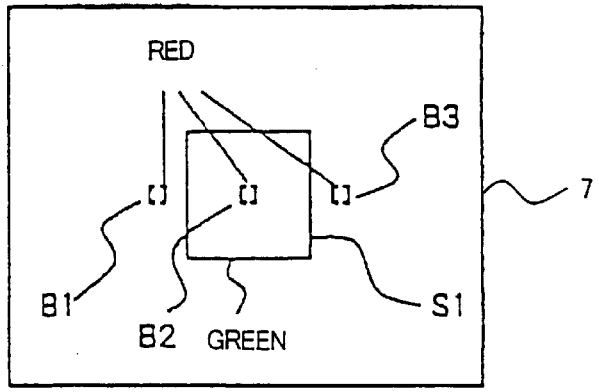
FIG. 6 is a schematic diagram which shows a display example of the auto focusing detection subject area represented by the LCD.
Figure 7:
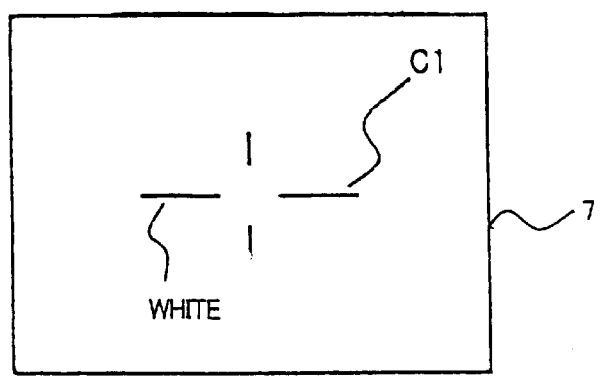
FIG. 7 is a schematic diagram which shows a display example of the auto focusing detection subject area represented by the LCD.
Figure 8:
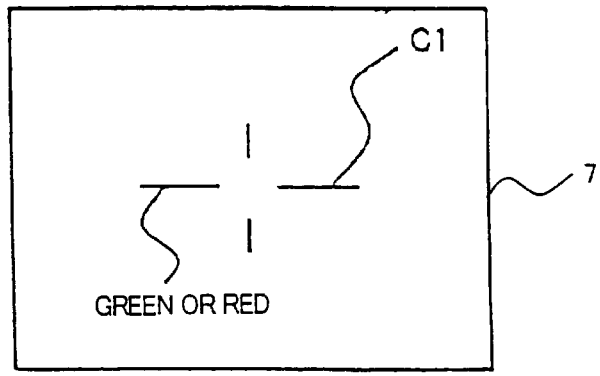
FIG. 8 is a schematic diagram which shows a display example of the auto focusing detection subject area represented by the LCD.

Furthermore, by operating the operation section 13, the user can select as the method of displaying the detection subject area, the (a) method of identifying and displaying the detection subject areas of the phase difference type auto focusing method and the contrast detection type auto focusing method (see FIGS. 5 and 6), and the (a) method of displaying the detection subject area provided by synthesizing the phase difference type auto focusing method and the contrast detection type auto focusing method (see FIGS. 7 and 8).

In the above-mentioned configuration, the CPU 1 and the IPP 5 serve as an area displaying unit, the CPU 1 serves as a judging unit, the CPU 1 and the IPP 5 serve as a display changing unit, and furthermore, the operation section 13 serves as a selection unit.

Next, the operation of the digital camera according to the second embodiment at the time of the AF will be explained. As mentioned above, the AF sensor 9 is a phase difference type sensor, an infrared ray type sensor, or the like. In contrast, as to the contrast detection type auto focusing, the contrast detection is executed by the contrast analysis based on the image data photographed by the CCD image pick-up element 3.

In the instance of the phase difference sensor or infrared ray sensor type auto focusing method, the distance measurement for the object is executed by the AF sensor 9 so that the photography lens system 2 is driven by the lens driving system 8 according to the distance measurement result. In the instance of the contrast detection type auto focusing method, the contrast of the image inputted by the CCD image pick-up element 3 is analyzed while moving the photography lens system 2 so as to search the position with the highest contrast.

Furthermore, the image information (raw data signal) taken in from the CCD image pick-up element 3 is digitized by the A/D converter 4, YUV-converted by the IPP 5, and inputted to the LCD 7 via the D/A converter 6. The monitoring screen (monitoring image) of the object area is displayed on the LCD 7. The auto focusing detection subject area is displayed while superimposed on the monitoring screen of the object area in the LCD 7 by the IPP 5 by the control of the CPU 1.

Figure 5:
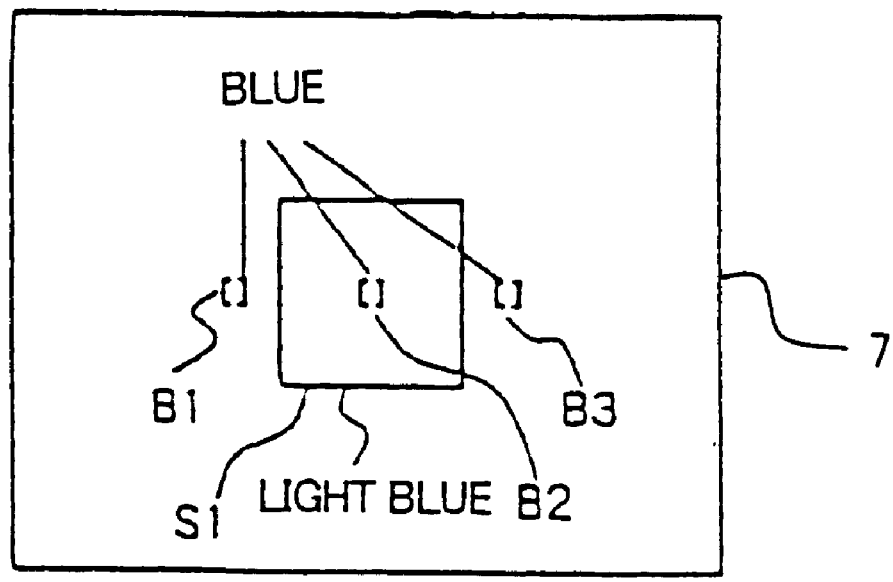
FIG. 5 is a schematic diagram which shows a display example of the auto focusing detection subject area represented by the LCD.

FIGS. 5 and 6 are diagrams that schematically show a display example of the detection subject area of the auto focusing displayed on the LCD 7. FIG. 5 shows a display example before execution of the auto focusing function, and FIG. 6 shows a display example after executing of the auto focusing function. In FIGS. 5 and 6, the monitoring screen is not shown.

In FIG. 5, the detection subject areas of the two kinds of the auto focusing methods (detection subject area S1 of the contrast detection auto focusing method, and the detection subject points B1, B2, B3 of the three point distance measurement auto focusing method using a phase difference sensor) are superimposed and displayed in different colors in the monitoring screen (photography field of view image) displayed on the LCD 7 screen. Here, the detection subject area denotes an area having a certain width, and the detection subject point denotes a spot-like position as an area having a substantially minimum width.

Specifically, blue color bracket-like area marks "[ ]" showing three mark points B1, B2, B3 represent the detection subject points in the three point distance measurement auto focusing method using a phase difference sensor. Moreover, the range shown by a light blue color rectangular frame-like area mark S1 represents the detection subject area in the contrast detection auto focusing method based on the contrast analysis by the CPU 1.

In the instance the user half-presses the release button during the monitoring operation (first stage), the digital camera executes the focusing operation. In the instance focusing by the auto focusing method by the AF sensor 9 comprising the phase difference sensor is failed and focusing by the contrast detection type auto focusing method by the CPU 1 is successful as a result of the focusing operation, for example, as shown in FIG. 6, the display color of the detection subject points B1, B2 and B3 is changed from "blue" to "red", and the display color of the detection subject area S1 is changed from "light blue" to "green".

In general, according to the contrast detection type auto focusing method, compared with the auto focusing method by the phase difference type sensor, an object at a relatively close distance can be focused as well. For example, in the instance of photographing an object at a 15 cm object distance, in the instance the contrast detection type auto focusing method succeeds in focusing even if the auto focusing method by the phase difference sensor is non-focused, it is said that the object can be focused. Therefore, oppositely, in the instance the contrast detection method is failed and the phase difference sensor method is successful as the focusing result of the auto focusing, there is a risk of non-focusing.

In contrast, in the instance an object to be focused is displaced leftward with respect to the center of the photography field of view, for example, in the instance only the area B1 at the left end is focused among the three distance measurement points of the phase difference type auto focusing and the other auto focusing including the contrast detection type shows non-focusing, it is assumed that the left side object is focused. The focus or non-focus judgment can be determined by the user by observing the focusing judgment result of the two auto focusing methods.

Moreover, it is also possible that the auto focusing detection subject areas are displayed by the above-mentioned methods, and the auto focusing judgment results are changed to have the display color of all the display marks B1 to B3 and S1 in "green color" in the instance the focus judgment is provided in the both auto focusing methods, and in the other instances, the display color of the display marks B1 to B3 and S1, or the like in "redcolor". It is also possible to define that the instance of executing focusing (distance measurement or focusing operation) by the two auto focusing methods and both of them are successful in focusing is referred to as being focused in the hybrid auto focusing function.

According to the above-mentioned display method, a user having deep knowledge of the camera can judge whether or not actually the camera is appropriately focused on the object depending on the situation. However, in the instance of a novice user not having deep knowledge of the camera, the display is rather complicated so that it is difficult to judge whether or not the object is focused as intended. Hereinafter, a display method of the detection subject area in the auto focusing, appropriate for a novice user will be explained with reference to FIG. 7 and FIG. 8.

FIGS. 7 and 8 shows a simplified area mark C1 obtained by synthesizing the display marks in FIGS. 5 and 6. FIG. 7 shows a display example before execution of the auto focusing function, and FIG. 8 shows a display example after execution of the auto focusing function. In FIG. 7 and 8, the monitoring image is not shown.

In FIG. 7, the area mark C1 obtained by synthesizing all the detection subject areas of the auto focusing methods used in the hybrid auto focusing function. The area mark C1 is in a cross-like shape with vertical and lateral straight lines combined in a cross-like state with the intersection part of the lines omitted. It is shown in "white color" as the standby display. Then, as shown in FIG. 8, while the focusing state is not realized after starting the auto focusing controlling operation, the area mark C1 is displayed in "red color" as the non-focused (that is, photography inadvisable) state. When the focusing state is realized after executing the auto focusing control, the area mark C1 is displayed in "green color". The focusing judgment result in this instance is either focused or non-focused.

The area mark for displaying the detection subject area is not limited to the embodiments shown in FIGS. 7 and 8, but it can be in any form as long as the user can see where the object image to be focused should be disposed on the display screen of the LCD 7.

As mentioned above, according to the hybrid auto focusing method, not only the method of detecting the focusing positions using independently the auto focusing method by the phase difference sensor and the contrast detection type auto focusing method, but also the focusing method as a combination of the both methods by measuring the distance on the whole by the auto focusing method by the phase difference sensor so as to specify the substantial focusing position, and sampling the vicinity thereof by the contrast detection type auto focusing method in detail.

Figure 9:
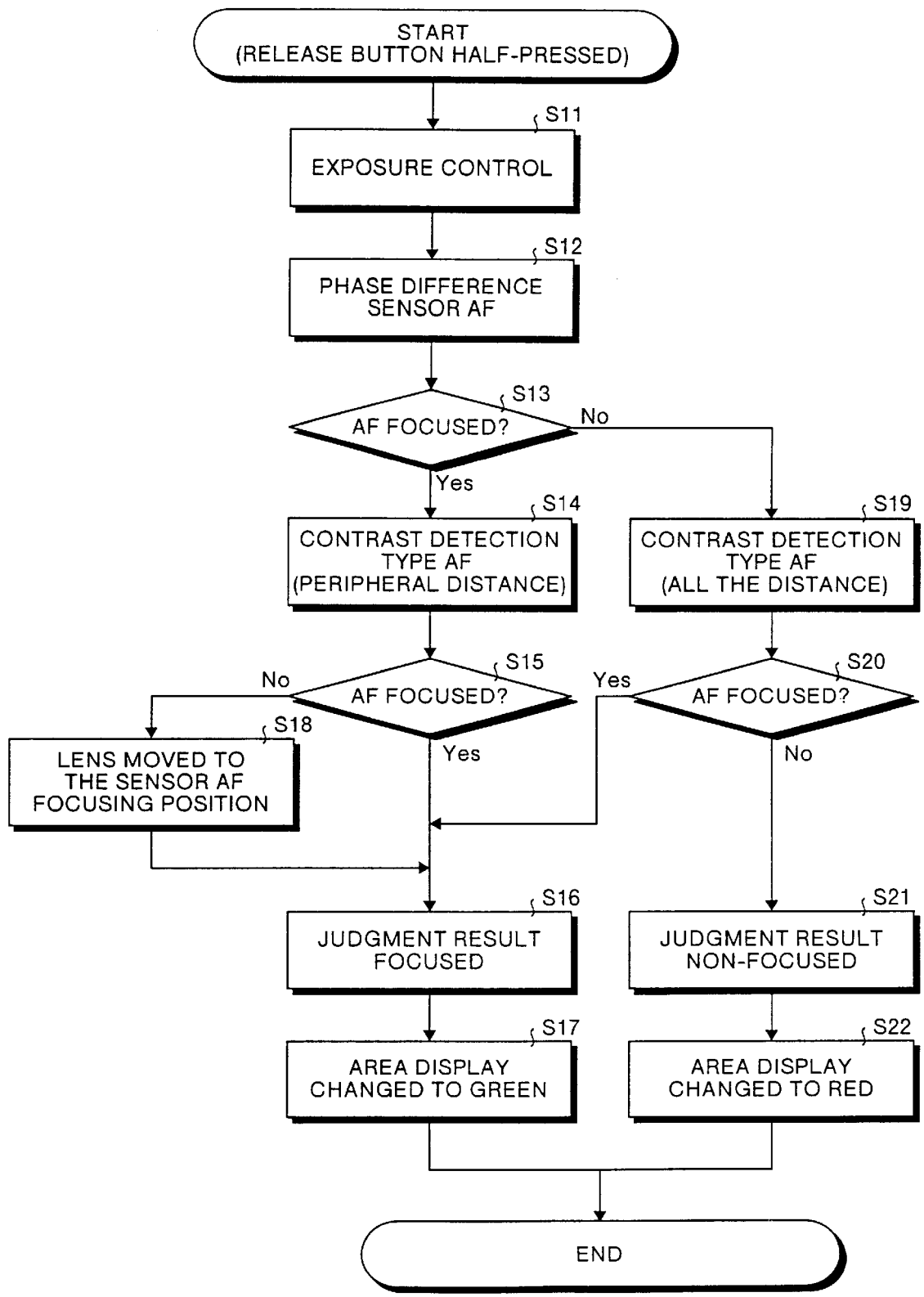
FIG. 9 is a flow chart which explains the focusing operation of the hybrid focusing function.

FIG. 9 is a flow chart which explains the focusing operation of the hybrid focusing function. The figure shows the flow of making the focus judgment as the hybrid auto focusing function in the instance at least the judgment result of at least one of the auto focusing methods is provided as focused in the focusing method of measuring the distance on the whole by the auto focusing method by the phase difference sensor so as to specify the substantial focusing position, and sampling the vicinity thereof by the contrast detection type auto focusing method in detail.

In FIG. 9, in the instance the release button is half-pressed, first, the CPU 1 controls the exposure (step S11), then, focusing by the phase difference sensor type auto focusing method is executed (step S12). The focusing result by the phase difference sensor type auto focusing method is judged (step S13).

As the judgment result, in the instance the phase difference sensor type auto focusing method succeeds in focusing, the CPU 1 executes focusing by the contrast detection methods with the distance in the vicinity thereof focused (step S14). Thereafter, the CPU 1 judges the focusing result by the contrast detection type focusing method (step S15).

As the judgment result, in the instance the contrast detection type focusing method succeeds in focusing, the focusing judgment result as the hybrid auto focusing function is made as success (step S16). As shown in FIG. 8, the area mark C1 color is changed to green color (step S17) so as to finish the process.

Moreover, at the step S15, in the instance the contrast detection type auto focusing method focusing is judged to be failed, the photography lens system is moved to the focusing position of the phase difference sensor type auto focusing method (step S18) so as to move to the step S16.

In contrast, in the instance the phase difference sensor type auto focusing method is failed at the step S13, the CPU 1 the contrast detection is executed by the contrast detection type auto focusing method per a predetermined step from the extremely close point to the infinite point for focusing (step S19). The CPU 11 judges the focusing result by the contrast detection type auto focusing method (step S20). In the instance focusing by the contrast detection type auto focusing method is judged to be successful, it moves to the step S16.

Moreover, in the above-mentioned step S20, in the instance focusing by the contrast detection type auto focusing method is failed, the CPU 1 judges that the focusing judgment result as the hybrid auto focusing function is failed (step S21) and changes the area mark C1 color to the red color as shown in FIG. 8 (step S22) so as to finish the process.

In the instance the focusing operation and the exposing control are executed as well as the stroboscope automatic light emission function is selected when the user half-presses the release button, judgment may be made for whether or not the stroboscope light emission is executed. At the time, in the instance the distance measurement result is a distance outside the stroboscope reaching range although the stroboscope light emission is to be executed, the area mark C1 display color may be changed to another color such as yellow color. Thereby, photography unintended by the user in the stroboscope light emission photography can effectively prevented.

Figure 10:
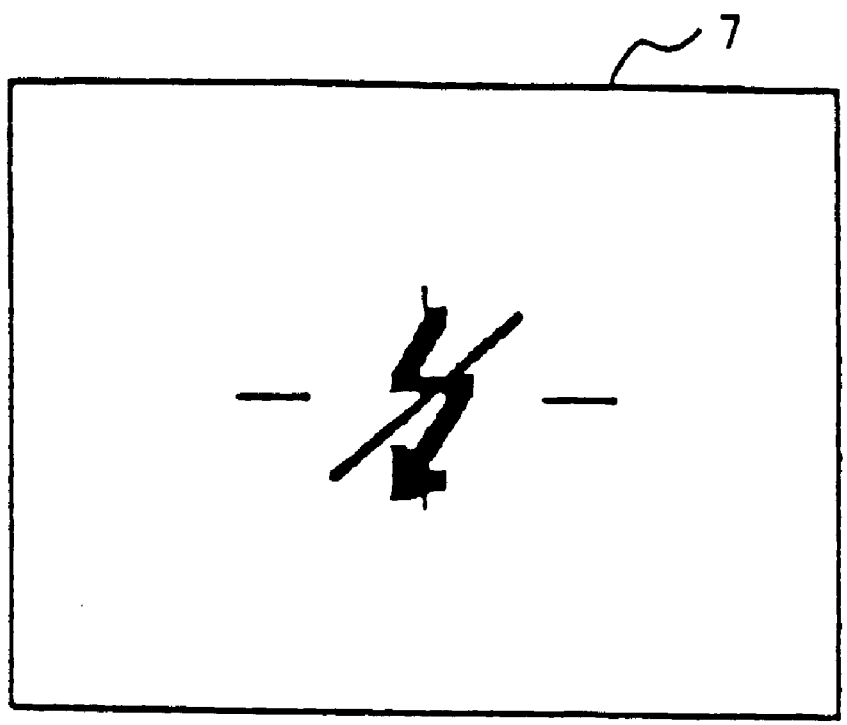
FIG. 10 is a diagram which shows the display state of a monitoring screen represented by the LCD.

Moreover, including the focusing judgment result of the auto focusing system, as to the color display, colors other than the above-mentioned may be used as well as the flicker display or a different area mark display shape may be adopted instead of changing the display colors. Furthermore, as shown in FIG. 10, another graphic showing inappropriateness of the stroboscope (electronic flash gun), or the like can be displayed.

Moreover, in the instance photography is executed with an inappropriate photography condition including the focusing judgment result, it is also possible that whether or not the image is to be taken into the external memory device 12 is selected by the user operation of the operation section 13 at the time the recording image configuration screen is displayed on the LCD 7 after the photography. Thereby, in the instance an inappropriate photography condition including the focusing judgment result by the hybrid auto focusing function exists, the user can avoid the taking in operation at the time of taking into the memory device after the photography, the labor of erasing an image photographed in a manner not intended by the user afterwards can be omitted.

As heretofore explained, according to the second embodiment, the IPP 5 displays the detection subject area to be focused by the hybrid auto focusing function, superimposed on the monitoring image of the LCD 7. The CPU 1 judges the focusing result at the time of operating the hybrid auto focusing function. The IPP 5 changes the display form of the detection subject area displayed on the LCD 7 according to the judgment result. Thereby, the user can easily recognize where to place the object to be focused in the monitoring screen in the image pick-up device comprising the hybrid auto focusing function.

Moreover, since the display/non-display of the detection subject area can be selected by the user operation of the operation section, intervention of the detection subject area display mark at the time of determining the composition by the user while observing the monitoring screen can be prevented.

Furthermore, as the judgment criterion for the focusing result of the hybrid auto focusing function, since anyone of the (a) method of judging that it is focused finally in the instance both of the phase difference type auto focusing method and the contrast detection type auto focusing methods succeeded in focusing, the (b) method of judging that it is focused finally in the instance at least one of the phase difference type auto focusing method and the contrast detection type auto focusing method succeeded in focusing, the (c) method of judging that it is focused finally in the instance either of the phase difference type auto focusing method and the contrast detection type auto focusing method is selected automatically based on the brightness in the detection subject area or the vicinity thereof, and the selected auto focusing method succeeded in focusing, and the (d) method of judging that it is focused finally in the instance the auto focusing method preliminarily selected by the operation of the operation section 13 by the user from the phase difference type auto focusing method and the contrast detection type auto focusing method succeeded in focusing is used by the CPU 1, the focusing result can be judged easily in any auto focusing method in the hybrid auto focusing function by corresponding to various judgment forms.

Moreover, since the focusing judgment criterion can be selected by the user operation of the operation section from the above-mentioned (a) to (d), the user can select the focusing judgment criterion of the hybrid auto focusing function.

Furthermore, since the detection subject areas are identified and displayed for each of a plurality of the auto focusing methods used in the hybrid auto focusing function (see FIG. 5 and FIG. 6), the detection subject are of each auto focusing method in the hybrid auto focusing function and the focusing judgment result can be recognized individually by the user.

Moreover, since the detection subject area obtained by synthesizing all the detection subject areas of a plurality of the auto focusing methods used in the hybrid auto focusing function are displayed (see FIG. 7 and FIG. 8), the auto focusing detection subject area can be displayed preferably for a novice user.

Furthermore, since the IPP 5 changes the display color or the display shape of the detection subject area displayed on the LCD 7 according to the focusing judgment result so as to have different display forms for the detection subject area, the display form for the detection subject area can be provided differently by an easy method.

Also in the instance of not using an electron finder at the time of using an optical finder, or the like, or in the instance of not displaying the detection subject area, an audio outputting unit which outputs the judgment results as a voice can be provided to advise the judgment results including the focusing, the exposure, the white balance, and the stroboscope appropriate exposure distance range.

The present invention is not limited to the above-mentioned embodiments, and it can be executed with optional modification within a scope not to change the gist of the invention.

As heretofore explained, according to one aspect of the present invention, in an image pick-up device comprising a monitor display section or a finder display section, since the photography advisability information obtaining unit which obtains photography advisability information showing whether or not the photography is advisable, and the display controlling unit which displays a target mark used as the criterion for the photography on a monitor display section or a finder display section and changes the target mark display form according to the content of the photography advisability information, are provided, the photography advisability information showing the advisability of the photography can be displayed easily in an easily understandable form without preventing the photography.

Moreover, according to another aspect of the present invention, in an image pick-up device comprising a display section which displays an image, having a hybrid auto focusing function usable with a combination of a plurality of auto focusing methods, to be used as an electron finder by displaying a monitoring image in the photography field of view in the above-mentioned display section, since the area displaying unit which displays the detection subject area to be focused by the hybrid auto focusing function on the display section, superimposed on the monitoring image, the judging unit which judges the focusing result at the time of operating the hybrid auto focusing function, and the display changing unit which changes the display form for the detection subject area to be displayed on the display section according to the judgment result of the judging unit, are provided, the detection subject area in the hybrid auto focusing function with a combination of a plurality of auto focusing methods and the focusing judgment result can be displayed easily in an easily understandable form without preventing the photography so that the object part desired by the user can easily be focused, and furthermore, the focusing judgment result can be recognized accurately by the user.

The present document incorporates by reference the entire contents of Japanese priority documents, 2001-121816 filed in Japan on Apr. 19, 2001 and 2001-114321 filed in Japan on Apr. 12, 2001.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image pick-up device having a monitor display section or a finder display section, the image pick-up device comprising:

a photography advisability information obtaining unit which obtains photography advisability information indicating whether or not an image can be picked-up; and a display controlling unit which displays a target mark and which changes the display form of the target mark according to the content of the photography advisability information, the target mark being configured to identify a tilt of the image pick-up device and including a first straight line and a second straight line which extends in a direction substantially perpendicular to the first straight line, the first and second straight lines being configured to be moved individually.

2. The image pick-up device according to claim 1, wherein the photography advisability information includes information on the focus/non-focus in the auto focusing control.

3. The image pick-up device according to claim 1, wherein the photography advisability information includes stroboscope use advisability information based on distance measurement information.

4. The image pick-up device according to claim 3, wherein the photography advisability information includes information on whether or not it is in a maximum range of the stroboscope.

5. The image pick-up device according to claim 3, wherein the photography advisability information includes information on whether or not it is in a minimum range of the stroboscope.

6. The image pick-up device according to claim 1, wherein the photography advisability information includes information on the focus/non-focus based on distance measurement information at the time of manual focusing.

7. The image pick-up device according to claim 1, wherein the display controlling unit changes the target mark display form by changing the target mark display color according to the content of the photography advisability information.

8. The image pick-up device according to claim 1, wherein the display controlling unit changes the target mark display form by changing the target mark flickering cycle according to the content of the photography advisability information.

9. The image pick-up device according to claim 1, wherein the target mark has a cross-like shape.

10. The image pick-up device according to claim 9, wherein the display controlling unit displays a distance measurement area based on lateral width and vertical width of the target mark.

11. An image pick-up device comprising:

a display section configured to display an image;

a hybrid auto focusing function unit configured to perform at least one of a three point distance measurement auto focusing method and a contrast detection auto focusing method;

an area displaying unit configured to display a set of target marks defining a plurality of detection subject points of the three point distance measurement auto focusing method and a second target mark defining a detection subject area of the contrast detection auto focusing method on the display section, the set of target marks and second target mark being superimposed as a monitoring image on the display section;

a judging unit which judges the focusing result at the time of operating the hybrid auto focusing function unit; and a display changing unit which changes the display form of said set of target marks and second target mark displayed on the display section according to the judgment result of the judging unit.

12. The image pick-up device according to claim 11, further comprising a selecting unit with which a user selects display or non-display of the detection subject points and area by the area displaying unit.

13. The image pick-up device according to claim 11, wherein the judging unit uses any one of methods (a) to (d) as the judgment criterion of a focusing result:

(a) judging that focusing of the hybrid auto focusing function unit is successful in the instance the focusing operations are executed in the three point distance measurement and contrast detection auto focusing methods and the three point distance measurement and contrast detection auto focusing methods succeeded in focusing, (b) judging that focusing of the hybrid auto focusing function unit is successful in the instance the focusing operations are executed in the three point distance measurement and contrast detection auto focusing methods and at least one of the three point distance measurement and contrast detection auto focusing methods succeeded the focusing, (c) judging that focusing of the hybrid auto focusing function unit is successful in the instance any of the three point distance measurement and contrast detection auto focusing methods is selected preliminarily based on the brightness in the detection subject points and area or the vicinity thereof, and the selected auto focusing method succeeded in focusing, and (d) judging that focusing of the hybrid auto focusing function unit is successful in the instance any of the three point distance measurement and contrast detection auto focusing methods is selected preliminarily by the user, and the selected auto focusing method succeeded in focusing.

14. The image pick-up device according to claim 13, further comprising a selecting unit with which a user selects one of the methods (a) to (d).

15. The image pick-up device according to claim 11, wherein the area displaying unit displays the set of target marks of the three point distance measurement auto focusing method distinctively from the second target mark of the contrast detection auto focusing method used in the hybrid auto focusing function unit.

16. The image pick-up device according to claim 11, wherein the area displaying unit is configured to display one target mark defining a detection subject area obtained by synthesizing all the detection subject points and area of the three point distance measurement and contrast detection auto focusing methods used in the hybrid auto focusing function unit.

17. The image pick-up device according to claim 11, wherein the display changing unit changes the display form of the set of target marks and second target mark by changing the display color or the display shape of the set of target marks and second target mark displayed on the display section according to the judgment result of the judging unit.

18. The image pick-up device according to claim 11, wherein the detection subject points of the three point distance measurement auto focusing method comprises three detection subject points for the three point distance measurement auto focusing method using a phase difference sensor.

19. The image pick-up device according to claim 11, wherein the detection subject area of the contrast detection auto focusing method includes a detection subject area in the contrast detection auto focusing method based on a contrast analysis.

20. The image pick-up device according to claim 11, wherein the detection subject points and area of the three point distance measurement and contrast detection auto focusing methods comprises three detection subject points for the three point distance measurement auto focusing method using a phase difference sensor and a detection subject area for the contrast detection auto focusing method based on a contrast analysis.

* * * * *